Figure 4:
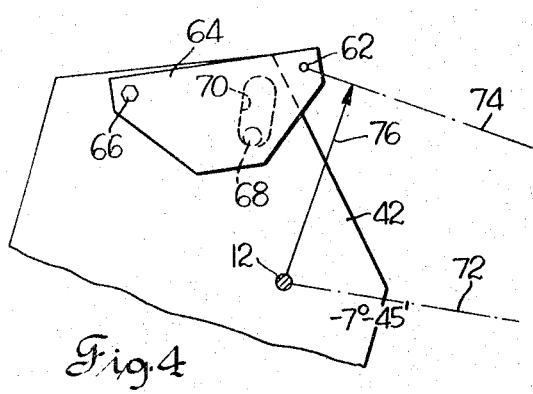

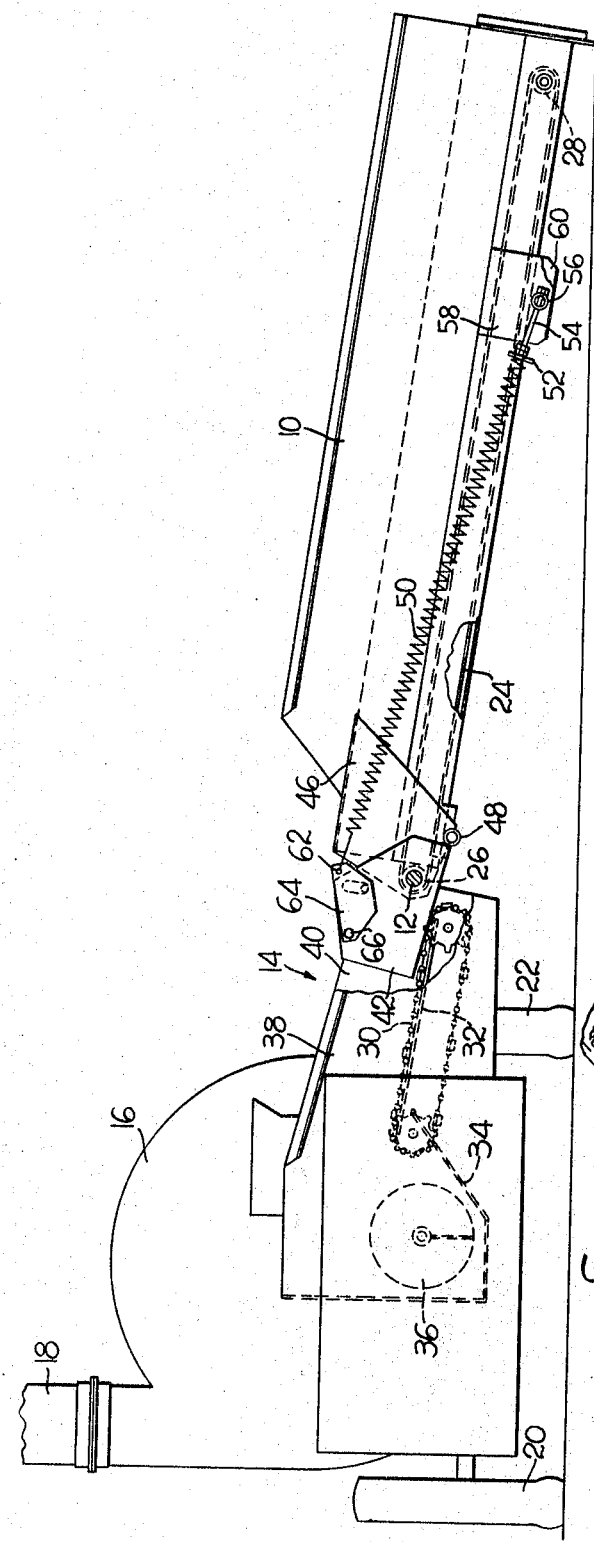

INVENTORS
PAUL A. WHISLER
JOHN J. SLAZAS

United States Patent Office 3,328,090
Patented June 27, 1967

3,328,090
FORAGE BLOWER
Paul A. Whisler, Milwaukee, and John J. Slazas, Hales Corners, Wis., assignors to Allis-Chalmers Manufacturing Company, Milwaukee, Wis.
Filed Apr. 25, 1966, Ser. No. 545,003
7 Claims. (Cl. 302—37)

This invention relates to ensilage blowers, silo fillers and the like, and one object thereof is to generally improve the operation and construction of machines of this type.

Such machines generally comprise a frame carrying or including a housing containing a blower wheel which blows, or cuts and blows, or throws the crop material out of the housing through a long pipe leading to a point of disposition, commonly a silo, and which may be of considerable height, for example sixty or seventy feet. Material must of course be supplied to the housing in order to be blown out, and for this purpose an elongated feed hopper or trough is disposed along the ground, projecting in what may be termed a forward direction from the housing, and is of a length somewhat greater than the width of the wagons or trucks supplying the crop material, so that the material may be discharged off of the wagon along the length of the hopper, and will be conveyed by suitable mechanism in the hopper toward and into the housing. Such an arrangement is of a shape which is awkward and not readily transported from one silo to another, and occupies an inordinate amount of space when in storage. Furthermore, the maneuvering of a wagon, particularly a trailer, backwardly into position with the rear over the hopper is very tricky, and not all tractor drivers are skillful enough to do it consistently. For these reasons the hoppers are commonly hingedly connected to the housings so that they may be swung upwardly into an upright position for transport and storage, and also so that the wagon can be driven into position in a forward direction, and the hopper lowered behind it. Such operation entails raising and lowering the hopper many times a day. The hopper is heavy, and raising and lowering it can become very irksome. Therefore attempts have been made to counterbalance these hoppers with springs, and while such arrangements have been generally satisfactory, they have left much to be desired.

For example, as the hopper is raised, the springs shorten and lose their force, so that the counterbalancing effect becomes insufficient as the hopper reaches a partially raised position. If this is corrected by increasing the power of the springs the operator may find that it is very difficult to pull the hopper down or to start it out of an upright position when desired. Complications have been added such as cam arrangements to try to equalize the lifting power of the springs and to match it to the changing weight or changing moment of the weight of the hopper as it is swung up and down, and it is the principal object of the invention to provide a very simple and inexpensive arrangement which will alter the moment arm of the spring at strategic points in the upward swinging of the hopper so that it will correspond closely with the changing moment of the weight of the hopper throughout the upward swing, and so that, when the upright position is reached, the spring will tend to hold the hopper there in a yielding manner, so that it will not tend to fall, and yet so that it can be readily pulled out of an upright position and still be adequately counterbalanced as the hopper is lowered.

Figure 5:
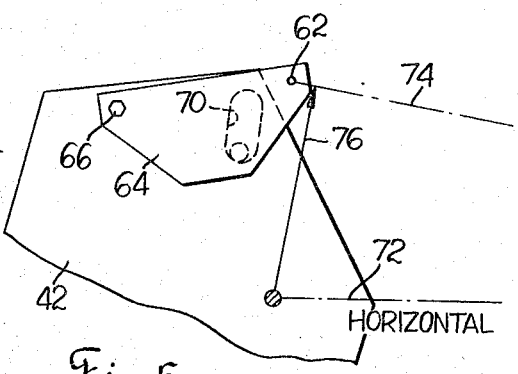
Figure 6:
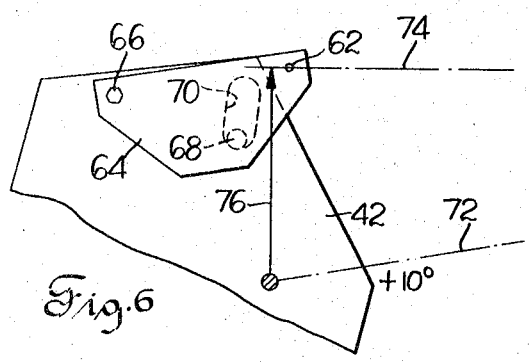
Figure 7:
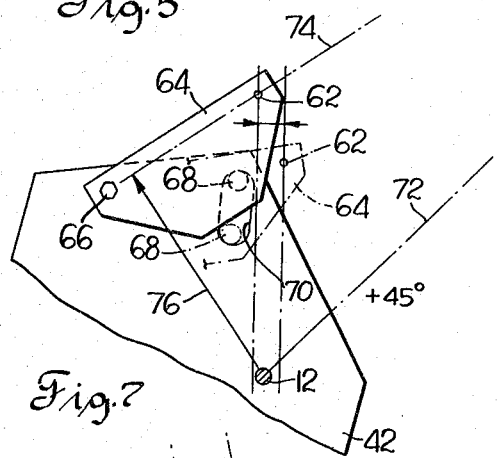
Figure 8:
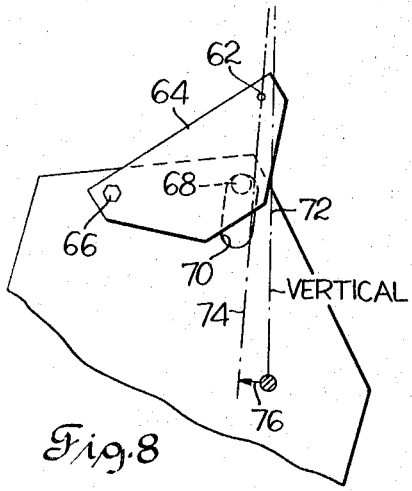
Figure 9:
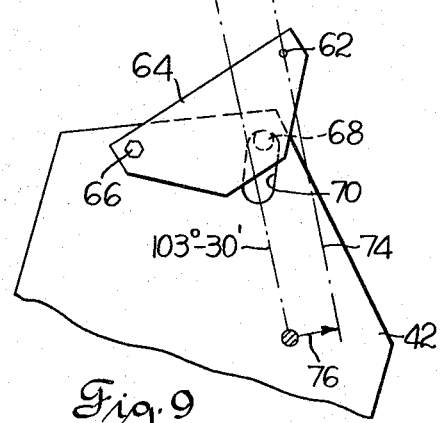

Further objects and advantages will become apparent from the following specification and annexed drawings in which:

FIG. 1 is a side elevation of a forage blower incorporating the invention with parts broken away to show what lies beyond;
FIG. 2 is an enlarged elevation of a portion of the FIG. 1 structure with the parts in a different position;
FIG. 3 is a similar view with the parts in a still different position;
FIG. 4 is a further enlarged diagrammatic representation of the parts shown in FIGS. 2 and 3, illustrating certain force relations;
FIG. 5 is a similar view showing the relations when the hopper is raised slightly;
FIG. 6 is a similar view showing the relations with the hopper raised still farther;
FIG. 7 is a similar view showing the relations with the hopper raised to a sharp angle;
FIG. 8 is a view showing the changed relations with the hopper vertical; and
FIG. 9 is a similar view showing the relations with the hopper raised and then swung beyond the vertical position.

As seen in FIG. 1, the illustrative machine includes a feed hopper or trough 10 having a pivotal connection or shaft 12 hinging it to a chute 14 fixed to or forming part of a housing 16 containing the usual blower or cutter wheel, which is not shown, as it forms no part of the present invention. A pipe 18 extends in the present instance upwardly from housing 16 and leads to a point of disposition of the cut material. The machine is carried on ground wheels 20 and 22 so as to be readily transported from one work point to another, and while this is being done it is desirable to swing hopper 10 about pivotal connection 12 to an upright position so that the machine will be more compact and require less width.

Hopper 10 has therein a conveyer belt 24 trained about rollers 26 and 28. Roller 26 is preferably journaled on or about pivot shaft 12 so that belt 24 is not affected by up-and-down swinging of hopper 10, and shaft 12 may also be the driving means for roller 26 and conveyer 24 if desired. Any suitable or well known means may be employed for driving belt 24 and the parts to be later described, such means being conventional. Belt 24 delivers material dumped into hopper 10 over roller 26 onto a conveyer 30, in the present instance a raddle traveling over a deck 32, and which delivers the material into a trough 34 in which operates an auger 36. Auger 36 conveys the material in a controlled manner into housing 16 so that it may be acted upon by the blower wheel therein, all as well known in the art. Chute 14 includes side sheets 38 and 40 to which are ruggedly fastened bracket plates 42 and 44 (see also FIG. 2) which are spaced apart the approximate width of the chute and between which is received the end of hopper 10 containing roller 26. Hopper 10 is strengthened by reinforcing plates as 46, and a tubular brace 48.

For partially counterbalancing the weight of hopper 10 to facilitate raising and lowering thereof as often as desired, a spring 50 is connected at one end to a fitting 52 threaded on an adjusting bolt 54 extending through a cross brace 56 carried in brackets 58 and 60 extending downwardly toward the forward end, and at the sides of hopper 10. Brace 56 is preferably tubular and may serve to reinforce and stiffen hopper 10. The other end of spring 50 has a pivotal connection at 62 with a link member 64 of irregular shape which is pivotally attached to bracket plate 42 at 66, spaced approximately the length of the link from pivotal connection 62, so that under the tension of spring 50 link member 64 tends to take a position with pivotal connections 62 and 66 aligned with spring 50 and bolt 54. As so far described, pivotal connection 66 would act as the attaching point of spring 50 to plate 42. However, it is desirable to have pivotal connection 62 serve as the attaching point during much of the upward swinging movement of hopper 10.

For this purpose link member 64 has a pin 68 rigidly fixed therewith between pivotal connections 62 and 66, extending away from the observer in the drawings, and playing generally up and down in a slot 70 in plate 42. Link member 64 is therefore free to swing until pin 68 reaches one or the other of the ends of slot 70, beyond which point the link can swing no farther, and this property of the construction is utilized to control the counterbalancing action as will appear.

It will be understood that a spring similar to spring 50 with its associated parts is used on the far side of hopper 10, but not visible in the drawings.

Referring now to FIG. 7, which indicates the two extreme positions of link member 64, it is to be noted that the parts are so proportioned that pivotal connection 62, when link member 64 is in the "down" position, with pin 68 in the bottom end of slot 70, is located slightly forwardly of the main pivotal connection 12 by which hopper 10 is attached to chute 14, while, when the link member is in the "up" position, with pin 68 at the top of slot 70, pivotal connection 62 is located slightly rearwardly of pivot 12, and advantage is taken of this peculiarity to achieve substantial stability of hopper 10 when it is in its upright position.

FIG. 4, which as stated is diagrammatic in character, shows bracket plate 42, link member 64, pivotal connection 12, pin 68 and slot 70. It also shows a line 72 representing the median plane of conveyer 24, and a line 74 representing the center or force line of spring 50. The pull of spring 50, as will be apparent from FIG. 1, causes an upward or counterclockwise effort on hopper 10, which can be resolved into a turning moment having a lever arm equal to the distance from pivotal connection 12 on a line perpendicular to line 74. This is represented by a line or vector 76, and in this view the hopper is in its lowermost position, or resting on the ground as seen in FIG. 1, and which would be the most common, although not the only operative position of the parts.

In the operation of the machine, starting with the hopper 10 in its upright position, the tractor and wagon or other conveyance would be driven past blower housing 16 and through the erstwhile position of hopper 10, and stopped with its discharge end adjacent said position. The hopper would then be lowered, the machine set into operation, and the material gradually dumped into the hopper, whereupon it would be conveyed into housing 16 and discharged through pipe 18. When it is desired to raise the hopper for another wagon to pass through, the sequence of events indicated in FIGS. 5 to 9 inclusive will take place.

As will be understood, the pull of spring 50 tends to rotate hopper 10 counterclockwise, just as if it were pulling to the left in FIG. 4, at the upper end of a lever arm of the length of vector 76 and rigidly fastened to hopper 10. In effect it takes some of the weight off of the hopper so that the raising of its does not require an excessive amount of effort on the part of the operator. The tension of spring 50 can be adjusted by manipulating bolt 54 so that the desired amount of weight is removed when the lifting is started. However, as the hopper moves up, spring 50 will be allowed to become shorter, and therefore will not pull so hard against brace 56, so that the counterbalancing effect will tend to diminish as the hopper is swung upwardly. At the same time the downward force caused by the weight of the hopper will become smaller as the hopper approaches an upright position. However, commonly the upward force of the spring will decrease faster than does the downward force of the weight of the hopper, so that it is very tiring to lift the hopper repeatedly to its upright position. There is also an element of risk in that, when it is desired to lower the hopper the weight is suddenly imposed on the operator before the spring becomes effective, which could result in the loss of control of the hopper and possible injury. The parts described operate to avoid these disadvantages by modifying the pull of spring 50, by controlling the varying length of vector 76, and by varying the effective point of anchorage of spring 50 to the stationary chute 14.

As the lifting of the hopper is started, it passes from a position where line 72 inclines forwardly and slightly downwardly (FIG. 4) to a position where line 72 is horizontal. At this point (FIG. 5) it will be noted that vector 76 is slightly longer than in FIG. 4. As the hopper is raised farther, vector 76 will intersect pivotal connection 62, at which point it will be its longest, in the FIG. 4 position of link 64. Passing to the FIG. 6 position in which line 72 is inclined upwardly 10°, vector 76 has begun to shorten. However, movement of the hopper within this range causes only very slight changes in the vector but correspondingly, such movement causes only very slight shortening of spring 50. Slight further movement of hopper 10 will swing spring 50 into alignment with pivotal connection 66, whereupon further movement will cause a considerable change in the action. Up to this point as stated, the changes in vector 76 are slight, but also the changes in the length of spring 50 are very small, so that the counterbalancing force remains nearly constant throughout this part of the movement.

Link 64, as previously noted, is free to swing upwardly and under the pull of spring 50, pivotal connections 66 and 62 remain in line with spring 50 and line 74. Connection 66 and not 62 now becomes the point of attachment of spring 50 to chute 14. As soon as this happens, vector 76 increases rapidly with further movement as the upswing continues, until the position shown in FIG. 7 is reached, thus compensating largely for the more rapidly decreasing strength of the spring. At this point pin 68 encounters the upper end of slot 70, and further upward swinging of link 64 is arrested. Again pivotal connection 62 becomes the point of attachment of spring 50, so that line 74 begins again to swing about pivotal connection 62, as the upward movement continues. This will have the effect of rapidly shortening vector 76 while at the same time reducing the rate at which spring 50 elongates. However, in this range the hopper is approaching a position wherein its weight is balanced over pivot 12, after which no further counterbalancing is needed. FIG. 8 shows the situation when line 72 is vertical, and it will be noted that vector 76 is very short, but still in the direction to tend to raise the hopper, or more properly to continue the rotation of it in a counterclockwise direction.

FIG. 9 shows the situation if hopper 10 is "raised" beyond the vertical position, and it is to be noted that vector 76 has now passed to the other side of pivot 12 so that the pull of spring 50 now tends to cause clockwise rotation of hopper 10 instead of counterclockwise, as heretofore.

It is to be noted that vector 76 is very short in FIGS. 8 and 9, so that relatively little force is required to overcome the force of the spring and start the downward or clockwise movement of the hopper. As the weight of the hopper begins to be effective in accentuating the downward movement spring 50 is stretched so that its force increases, and at the same time vector or lever arm 76 increases in length in a manner which is the reverse of that just described, so that the major portion of the weight of the hopper is taken by the spring, and only a minor portion need be handled by the operator.

When silo filling, the operator merely raises the hopper to its uppermost position, which he can do readily by virtue of the assistance given by the spring and novel linkage. When the wagon has been "driven through," the hopper is easily lowered since the effect of the spring force, as apparent from FIGS. 8 and 9, is slight. Unlike prior constructions, the provision of a spring having a force sufficient to make it easy to lift the hopper does not make it difficult to start it away from its upright position, and yet when the downward movement is started the counterbalancing force builds up rapidly enough to make it also easy to keep the lowering movement in control.

While a specific embodiment of the invention has been described, it is to be understood that variations in the details of the device may occur to others skilled in this art, and it is not intended that the invention shall be limited by anything in the description, or in fact in any manner except as defined in the claims.

The embodiments of the invention in which an exclusive property or privilege is claimed are defined as follows:

1. In a forage blower having a frame, a feed hopper, pivot means connecting said feed hopper to said frame for swinging movement between a lowered crop receiving position and an upright inoperative position, spring means connected at one end to said hopper at a point spaced forwardly from said pivot means and extending backwardly and upwardly to a region generally above said pivot means, link means pivotally connected to said frame above and rearwardly of said pivot means and to the other end of said spring means, and motion limiting means interposed between said link means and said frame constituted to prevent downward swinging of said link means beyond a predetermined point, and to prevent upward swinging of said link means beyond a predetermined point, said motion limiting means providing for free swinging of said link means between such predetermined points.

2. A device containing all of the characteristics of claim 1 in which said motion limiting means is constituted to prevent downward swinging of said link means to a position wherein it is in alignment with said spring when said feed hopper is resting on the ground.

3. A device containing all of the characteristics of claim 1 in which said motion limiting means is constituted to prevent upward swinging of said link means to a position wherein said link means is in alignment with said spring when said feed hopper is in said upright position.

4. A device containing all of the characteristics of claim 1 in which said motion limiting means is constituted to prevent downward swinging of said link means to a position where it is in alignment with said spring when said feed hopper is resting on the ground, and to prevent upward swinging of said link means to a position wherein said link means is in alignment with said spring when said feed hopper is in said upright position.

5. A device containing all of the characteristics of claim 1 in which said frame includes an upwardly directed wall element, and in which said link means includes a link element, a pivotal connection secured to said link element and to said wall element, pivotally connecting said link element to said wall element, a connection securing said spring means to said link element, spaced forwardly of said pivotal connection, one of said elements providing an opening, and the other element providing a pin fixed thereto and projecting into said opening to move therein upon swinging of said link element, and to limit such swinging movement to a predetermined amount by engagement with the margins of said opening.

6. A device containing all of the characteristics of claim 1 in which said frame includes an upwardly directed wall element, a link element, a pivotal connection secured to said link element and to said wall element pivotally connecting said link element to said wall element, a pivotal connection securing said spring means to said link element spaced forwardly of the first mentioned pivotal connection, one of said elements providing an upwardly directed slot, and the other element providing a pin fixed thereto and projecting into said slot to move therein upon swinging of said link element, and to limit such swinging movement by engagement with the ends of said slot.

7. A device containing all of the characteristics of claim 1 in which said frame includes an upwardly directed wall, and in which said link means includes a link member, a pivotal connection secured to said link member and to said wall, pivotally connecting said link member to said wall rearwardly of said pivot means connecting said feed hopper and said frame, a second pivotal connection securing said spring means to said link member, spaced forwardly of the first mentioned pivotal connection, and in which said motion limiting means is constituted to limit downward swinging of said link member to a position wherein said second pivotal connection is disposed upwardly and forwardly of said pivot means connecting said feed hopper to said frame, and to limit upward swinging of said link member to a position wherein said second pivotal connection is disposed upwardly and rearwardly of said pivot means connecting said hopper and said frame.

References Cited

UNITED STATES PATENTS 3,154,189   10/1964   O'Hanlon _____ 198—115

EVON C. BLUNK, *Primary Examiner.*

RICHARD E. AEGERTER, *Examiner.*